Dec. 17, 1968   R. E. DAY   3,416,819
MOTION COMPENSATOR
Filed Aug. 9, 1967
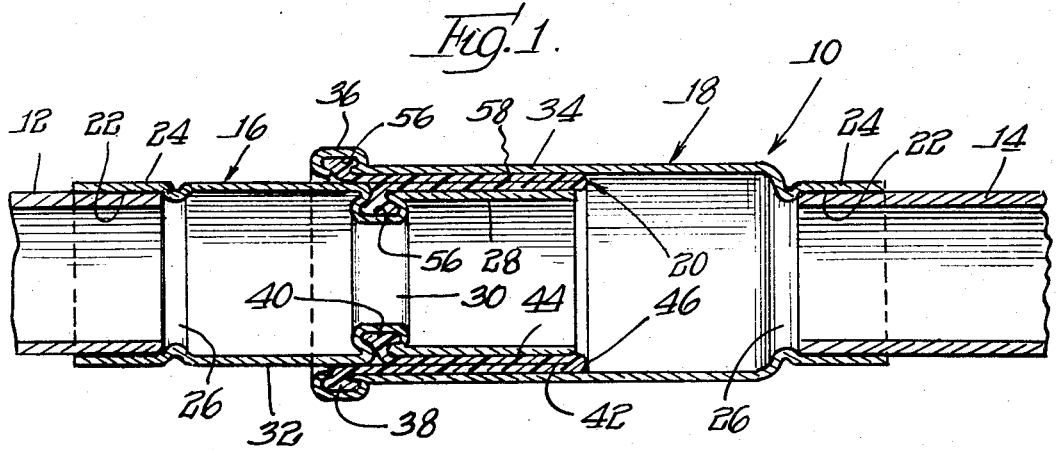
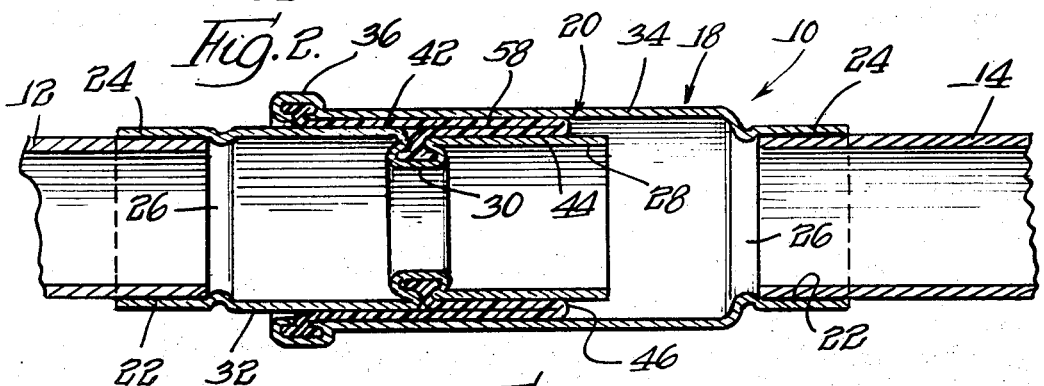
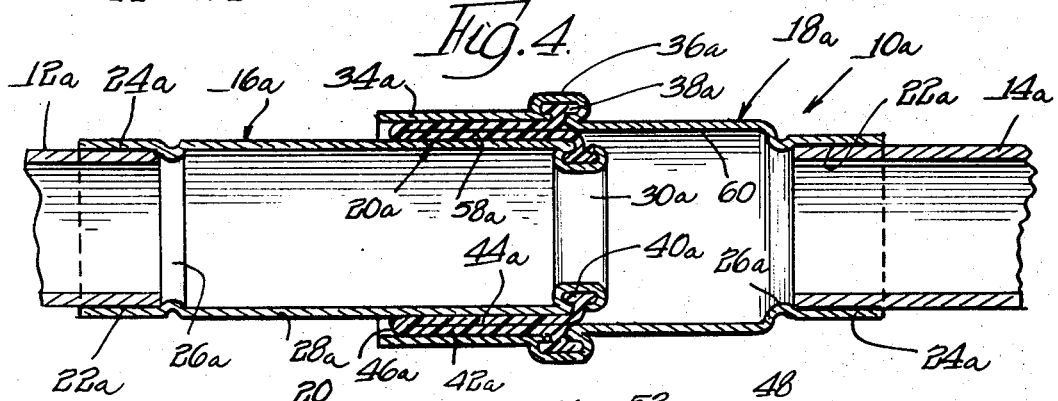
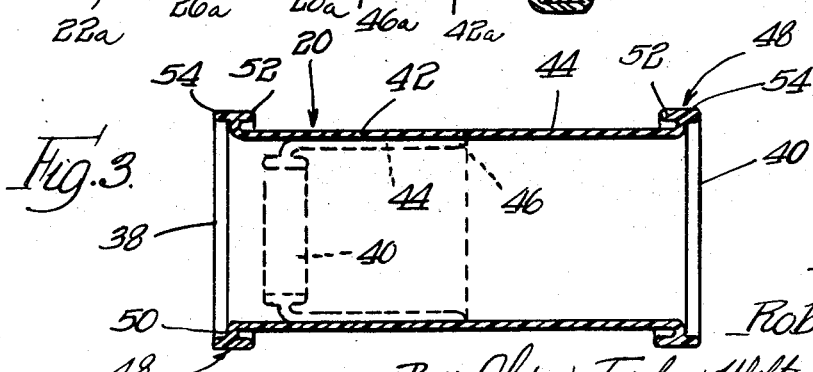
Inventor
Robert E. Day
By: Olson, Trexler, Wolters & Bushnell attys.

United States Patent Office 3,416,819
Patented Dec. 17, 1968

3,416,819
MOTION COMPENSATOR
Robert E. Day, Crystal Lake, Ill., assignor to Calumet
& Hecla, Inc., Evanston, Ill., a corporation of Michigan
Filed Aug. 9, 1967, Ser. No. 659,420
10 Claims. (Cl. 285—302)

ABSTRACT OF THE DISCLOSURE

A motion compensator in which telescopingly interfitting tubular members are joined by a sleeve of tough, flexible material, the sleeve being folded upon itself to establish two tubular portions that are disposed in telescopingly reentrant relationship.

---

This invention relates generally to devices which act to take up relative axial movements.

In one specific aspect, the present invention relates to devices for accommodating thermally induced motion in a piping system.

It is known that a conduit or pipe elongates when heated and contracts when cooled. In piping systems, these thermally induced motions are ordinarily accommodated by means of a corrugated metal bellows which is provided in a joint located between two of the conduits. The bellows, by expanding and contracting through relative movement of the corrugations, permits the conduits to respond to temperature changes in the transmitted fluid. The effectiveness of corrugated bellows for absorbing thermal contractions and expansions between lengths of conduit is attested to by widespread commercial use. However, bellows have inherent drawbacks. For example, corrugated bellows possess a relatively short service life. Leaks develop from failure caused by stress concentration at the crests and valleys of the corrugations during the flexing of the bellows. Another drawback is that each corrugation can absorb only a limited amount of relative axial movement. Therefore, comparatively long bellows having many corrugations must be utilized to absorb thermal contractions and expansions in systems utilizing conduits of any appreciable length. Such elongate bellows are difficult to install and are both complicated and expensive to manufacture.

Therefore, an important object of the present invention is to provide an inexpensive motion compensator having a long service life.

A more general object of the invention is to provide a new and improved motion compensator.

Another object of the invention is to provide a joint which accommodates comparatively large relative end movements.

Still another object of the invention is to provide a motion compensator which is characterized by noiseless operation.

Yet another object of the invention is to provide a motion compensator having fast response to incipient motion in the associated system.

A further object of the invention is to provide a motion compensator which is easy to manufacture and install.

These and other objects and features of the invention will become more apparent from a consideration of the following descriptions, taken in connection with the accompanying drawings wherein:

FIG. 1 is a longitudinal sectional view of a motion compensator constructed in compliance with the principles of the invention and shown connected in a piping system;

FIG. 2 is a view similar to the showing of FIG. 1 but illustrating the compensator responding to thermal expansion of the piping system;

FIG. 3 is a longitudinal sectional view of the flexible sleeve used in compensator of FIGS. 1 and 2, the sleeve being shown in its as-fabricated condition in solid outline and its use condition in broken outline; and FIG. 4 is a view similar to the showing of FIG. 1 but illustrating a modified embodiment of the invention in which the flexible sleeve is internally rather than externally pressurized.

One important use of the motion compensator of the invention is in the art of domestic hot water heating systems; and hereinafter, such art will be used for purposes of explanation and illustration only without intending to limit the applications and uses of the invention in any way.

Referring now in detail to the drawing, specifically to FIG. 1, a motion compensator 10 is shown connected to the spaced ends of a pair of copper alloy water pipes 12 and 14. It is appreciated that the motion compensator 10 may form a joint between other types of conduits carrying other fluids. The compensator 10 includes three basic parts, a first fitting member 16, a second fitting member 18 and a sleeve 20. When the compensator 10 is to be incorporated in a piping system comprising copper alloy conduit, the fitting members 16 and 18 are conveniently fabricated from the same metal to eliminate the possibility of galvanic corrosion and to facilitate installation of the compensator by means of conventional, annular soldered joints 22. To promote ease of installation, fitting members 16 and 18 include coupling end portions 24 which are sized telescopingly to receive the conduits 12 and 14 respectively and which terminate axially inwardly in radially constricted throats 26, these throats serving to locate the ends of the respective pieces of conduit in the proper position.

Continuing with reference to FIG. 1, the fitting member 16 includes a primary, tubular guide portion 28, an annular mounting formation 30 and a secondary guide portion 32, guide portion 32 being disposed generally intermediate the constricted throat 26 and the mounting formation 30 whereas the mounting formation 30 is disposed interjacent the guide portions 28 and 32. Cooperatively, the fitting member 18 comprises a primary, tubular guide portion 34 and an annular mounting formation 36. The guide portion 34 is sized telescopingly to receive the fitting member 16, and the mounting formation 36 is terminally disposed with respect to the guide portion 34.

Turning for the moment to FIG. 3 for a description of the sleeve 20, that member comprises opposite end elements 38 and 40 and first and second tubular, medial portions 42 and 44. In the as-fabricated condition, which is shown in solid outline, the tubular portions 42 and 44 merge to form a cylindrical sleeve of uniform thickness and diameter. However, in the configuration in which it is used, the sleeve 20 is telescoped so that tubular portion 44 resides interiorly of the tubular portion 42 in reentrant relationship therewith, as is suggested in broken outline. In this use configuration, an annular folded portion 46 joins the tubular portions 42 and 44. For purposes which will become more apparent hereinafter, each of the end elements 38 and 40 comprises an axially extending flange 48 and a radially extending support rib 50. In addition, the flange 48 includes a proximal flange portion 52 and a distal flange portion 54 that is substantially coplanar with flange portion 52.

In compliance with the present invention, the sleeve 20 is fabricated from a tough, flexible material. It is also of advantage for the selected material to possess good high temperature performance. Such materials as silicone and fluorocarbon elastomers are eminently useful, and fluorocarbon polymers generally are advantageous to employ because of their temperature resistance. Depending upon the specific temperature conditions to be encountered and the nature of the fluid to be carried or transmitted, numerous other materials may be selected for the fabrication of sleeve 20, including nitrile and polyacrylic rubbers and specially formulated polymers of such substances as ethylene, butadiene and 1-olefins. Surface-fluorinated rubbers are also useful in that their low dipole force prevents them from being attracted to contacting surfaces. The material for sleeve 20 may also be reinforced with glass, organic or metallic fibers; and such fibers are preferably aligned with the longitudinal axis of the sleeve or at an angle thereto but not radially.

Returning to FIG. 1, the telescoped tubular portions 42 and 44 of sleeve 20 are confined between guide portion 28 of fitting member 16 and guide portion 34 of fitting member 18; and in order to seal the juncture of fitting members 16 and 18 against fluid leakage, the end elements 38 and 40 are secured, respectively, to the annular mounting formations 36 and 30. Advantageously, this attachment is achieved by crimping the deformable metal of the fitting members to grip the annular end elements of the sleeve and compress the material of the end elements in tightly squeezed relationship. When the end elements 38 and 40 are fashioned with an axially extending flange 48 and a radially extending support rib 50, as previously described, the mounting formations 36 and 30 are desirably shaped so that the metal walls thereof define a cavity 56 which snugly matably receives the corresponding end element. Solvent welded, fusion or adhesive mounting may also be employed in hermetically sealing the flexible sleeve 20 to the fitting members 16 and 18.

In compliance with the present invention, the primary guide portions 28 and 34 are generally radially aligned, and these guide portions are relatively closely spaced in the radial direction. Thus, the sleeve portions 42 and 44 are disposed in contact to define a sliding interface 58. It is also desirable that the mounting formations 36 and 30 be disposed out of the general path of movement. Accordingly, mounting formation 36 is located generally radially outwardly of its associated guide portion; and mounting formation 30 is situated generally radially inwardly of its associated guide portion. It is also important to observe that the secondary guide portion 32 of fitting member 16 is radially offset with respect to guide portion 28, i.e. guide portion 32 includes an outer surface whose diameter is greater than the outside diameter of the primary guide portion 28 by a distance equal to twice the thickness of sleeve portion 44. Hence, upon relative sliding movement of the sleeve portions 42 and 44, the portion 42 will experience relative straightline movement directed by the secondary guide portion 32.

It is also to be observed that the closed end of the folded sleeve portion 46, in the embodiment of FIGS. 1 and 2, faces axially inwardly of the space between guide portions 28 and 34. So arranged, the sleeve 20 excludes those pressure conditions inside the compensator 20 from the mutually confronting surfaces of sleeve portions 42 and 44, i.e. from the interface 58. This arrangement of the sleeve is of particular advantage when the sleeve itself is fabricated of thermoplastic material because the resulting externally pressurized state of the sleeve acts to prevent creep of the sleeve material when the compensator 10 is installed in a piping system conducting fluid at moderately high temperatures.

Having thus described the construction of one embodiment of the invention, it will be valuable now to set forth the manner in which the described parts cooperate. With the compensator 10 assembled to the conduits 12 and 14 as part of a hot water piping system in compliance with the descriptions given hereinabove, the sleeve 20 and the fitting members 16 and 18 will assume the position shown in FIG. 1 when the fluid in the piping system is at the general temperature of the components at the time of their installation. The overlapped and snugly confined condition of the sleeve portions 42 and 44 insures initial axial alignment of the coupling end portions 24 and minimizes relative axial cocking of the parts at the time of installation. When the fluid in the piping system is elevated in temperature, as would be experienced when heat is demanded in the associated radiation units, there will be a corresponding elongation in the conduits 12 and 14; and the compensator 10 will experience a shortening of its axial length in response, as is illustrated in FIG. 2. This shortening of the axial length of the compensator will be accomplished by guide portion 34 telescoping generally over the guide portions 28 and 32. At the same time, there will be a relative sliding action of the sleeve portions 42 and 44 at the interface 58 and a relative sliding movement of the sleeve portion 42 over the outside surface of guide portion 32. However, an instantaneous region of rolling flexure will occur as the folded portion 46 travels along the tubular body of the sleeve 20. The resulting avoidance of any frictional impedance caused by sliding action between the sleeve and the guide portions 28 and 34 assures rapid response in the compensator and minimizes the accumulation of stress in the associated piping system. This rolling action additionally cooperates with the separation of all rigid parts by the sleeve 20 in developing noiselessness in the response of the compensator to elongating or contracting forces. It is also important to realize that the compensator of the invention is capable of absorbing a substantial amount of relative axial movement. The force necessary to produce a given increment of movement does not increase as the total stroke of the compensator increases because the only relatively stressed region of the sleeve is at the folded portion 46, the stress at this section being the same regardless of the relative positions of the sleeve end elements 38 and 40. Thus, the compensator of the invention is capable of absorbing a long movement as easily as a short one, the only forces tending to resist movement being those involved in relocating the folded portion 46 from one region of the sleeve to another. The ease of manufacture of the instant compensator is evident from the minimum number of parts involved, the simple metal working operations required to form the fitting members 16 and 18, the facility by which the sleeve 20 may be fabricated in the general form shown in solid outline in FIG. 3, and the obvious ease of attachment using the mounting formations 30 and 36.

While one useful embodiment of the invention has been thus far shown and described, the invention is not limited thereto and many modifications may be made. Therefore and in order to enhance the understanding of the invention, a modified embodiment is shown in FIG. 4. Since the embodiment of FIG. 4 includes elements which are similar to those found in the embodiment of FIGS. 1–3, like numerals have been used to designate like parts with the suffix letter "a" being employed to distinguish those common elements associated with the embodiment of FIG. 4.

The motion compensator 10a shown in FIG. 4 is characterized by an end-for-end reversal of the sleeve 20a whereby to dispose the closed end of folded sleeve portion 46a facing in an axially outward direction relative to the space between guide portions 28a and 34a. With the sleeve 20a so arranged, the confronting surfaces of the tubular sleeve portions 42a and 44a, which define the sliding interface 58a, are exposed to the pressure conditions existing interiorly of the compensator. Cooperatively, the mounting formation 30a is disposed at one end of guide portion 28a, and mounting formation 36a is disposed between primary guide portion 34a and a secondary guide portion 60 fashioned in the fitting member 18a between throat 26a and guide portion 34a. Whereas the secondary guide portion 32 of motion compensator 10 is radially outwardly offset relative to the primary guide portion 28, the secondary guide portion 60 is radially inwardly offset relative to the primary guide portion 34a.

Additionally, the fitting member 16a includes only a primary guide portion and no secondary guide portion.

The drawings and the foregoing descriptions are not intended to represent the only forms of my invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A motion compensator comprising: a first fitting member having a first guide portion and an annular mounting formation; a second fitting member having a tubular second guide portion sized for telescoping movement relative to said first fitting member and having an annular mounting formation; and a sleeve of tough, flexible material including first and second annular end elements secured respectively to said annular mounting formations, first and second tubular portions terminating respectively in said end elements and an annular, folded portion joining said first and second tubular portions in telescopingly reentrant relationship between said guide portions, said first and second tubular sleeve portions slidably engaging each other and rollably engaging the adjacent guide portions, said tubular sleeve portions being snugly confined between said guide portions whereby said tubular sleeve portions maintain uniform separation between said guide portions.

2. A motion compensator according to claim 1 wherein said first fitting member mounting formation is disposed radially inwardly of the outer surface of its associated guide portion; and wherein said second fitting member guide formation is disposed radially outwardly of the inner surface of its associated guide portion whereby to space said guide portions relatively closely in the radial direction.

3. A motion compensator according to claim 1 wherein said tough, flexible material is a compressible, organic polymer; wherein said fitting members are of deformable metal; and wherein said mounting formations crimpably grip said annular end elements.

4. A motion compensator according to claim 1 wherein the closed end of said folded sleeve portion faces axially outwardly of the space between said guide portions whereby to expose the mutually confronting surfaces of said tubular sleeve portions to pressure conditions inside said compensator.

5. A motion compensator according to claim 1 wherein the closed end of said folded sleeve portion faces axially inwardly of the space between said guide portions whereby to exclude pressure conditions inside said compensator from the mutually confronting surfaces of said tubular sleeve portions.

6. A motion compensator according to claim 1 wherein each of said annular end elements comprises an axially extending flange and a radially extending support rib connected to said flange; and wherein each of said mounting formation comprises wall means defining a cavity snugly matably receiving the corresponding end element.

7. A motion compensator according to claim 6 wherein said flange includes a distal flange portion and a proximal flange portion which is disposed generally coplanarly with said distal flange portion.

8. A motion compensator according to claim 1 wherein said first and second guide portions are generally radially aligned.

9. A motion compensator according to claim 8 wherein said first fitting member additionally includes a secondary guide portion axially offset from said first guide portion; and wherein said first fitting member mounting formation is disposed interjacent said first and said secondary guide portions.

10. A motion compensator according to claim 8 wherein said second fitting member additionally includes a tubular secondary guide portion axially offset from said second guide portion; wherein said second fitting member mounting formation is disposed interjacent said second and said secondary guide portions.

References Cited

UNITED STATES PATENTS

| | | | |
|---|---|---|---|
| 2,223,480 | 12/1940 | Darling | 285—299 X |
| 2,920,908 | 1/1960 | Mitchell | 285—53 |
| 3,012,546 | 12/1961 | Heintzmann et al. | 74—18.2 X |
| 3,224,598 | 12/1965 | Austgen | 285—302 X |
| 2,192,395 | 3/1940 | La Bour | 285—229 X |

FOREIGN PATENTS

| | | |
|---|---|---|
| 1,493,130 | 7/1967 | France. |
| 1,158,776 | 12/1963 | Germany. |
| 768,818 | 2/1957 | Great Britain. |

CARL W. TOMLIN, *Primary Examiner.*

DAVE W. AROLA, *Assistant Examiner.*

U.S. Cl. X.R.

285—175, 364, 423; 74—18.2